(12) United States Patent
Sato et al.

(10) Patent No.: US 8,779,825 B2
(45) Date of Patent: Jul. 15, 2014

(54) SIGNAL PROCESSING APPARATUS

(75) Inventors: Tsuneo Sato, Tokyo (JP); Teruyoshi Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/981,932

(22) PCT Filed: Jul. 6, 2011

(86) PCT No.: PCT/JP2011/065455
§ 371 (c)(1),
(2), (4) Date: Jul. 26, 2013

(87) PCT Pub. No.: WO2013/005313
PCT Pub. Date: Jan. 10, 2013

(65) Prior Publication Data
US 2013/0307600 A1    Nov. 21, 2013

(51) Int. Cl.
*G06F 1/04* (2006.01)
(52) U.S. Cl.
USPC .............................. 327/291; 327/294; 327/298
(58) Field of Classification Search
USPC .................... 327/291, 293, 294, 298–299
See application file for complete search history.

(56) References Cited

U.S. PATENT DOCUMENTS

| | | | |
|---|---|---|---|
| 5,233,617 A * | 8/1993 | Simmons et al. | 714/814 |
| 5,539,337 A * | 7/1996 | Taylor et al. | 326/94 |
| 6,229,363 B1 | 5/2001 | Eto et al. | |
| 6,959,061 B1 * | 10/2005 | Kuwata | 375/373 |
| 7,777,536 B2 * | 8/2010 | Yagi | 327/141 |
| 7,920,699 B2 | 4/2011 | Fujisaki et al. | |
| 2008/0218225 A1 | 9/2008 | Shibayama et al. | |

FOREIGN PATENT DOCUMENTS

| | | |
|---|---|---|
| JP | 5 313780 | 11/1993 |
| JP | 11 316618 | 11/1999 |
| JP | 2000 83019 | 3/2000 |
| JP | 2003 337750 | 11/2003 |
| JP | 2006 229485 | 8/2006 |
| JP | 2009 27472 | 2/2009 |
| WO | 2006 030904 | 3/2006 |

OTHER PUBLICATIONS

International Search Report Issued Aug. 30, 2011 in PCT/JP11/065455 Filed Jul. 6, 2011.

* cited by examiner

*Primary Examiner* — An Luu
(74) *Attorney, Agent, or Firm* — Oblon, Spivak, McClelland, Maier & Neustadt, L.L.P.

(57) ABSTRACT

A delay element delays an output signal Dt from an arithmetic circuit and outputs a delayed signal Dd. An XOR element compares the output signal Dt with the delayed signal Dd, and outputs an XORout signal with the signal value "0" when the signals match each other, and outputs an XORout signal with the signal value "1" when the signals do not match each other. In a flip-flop, when the signal value of the XORout signal at the rise of a clock of a clock signal CK is "0", the output signal Dt is output from a flip-flop, and when the signal value of the XORout signal at the rise of the clock becomes "1" even once, a fixed value of the signal value "0" continues to be output.

8 Claims, 5 Drawing Sheets

SIGNAL PROCESSING APPARATUS

TECHNICAL FIELD

The present invention relates to a signal processing apparatus.

BACKGROUND ART

As a technique related to the present invention, there is, for example, a signal processing circuit described in Patent Literature 1.

In the signal processing circuit of Patent Literature 1, there is shown a signal processing circuit in which the same encryption processes are performed in parallel by a plurality of circuits that perform logically the same processes.

More specifically, the signal processing circuit of Patent Literature 1 includes a first circuit that performs an encryption related process; and a second circuit that performs an encryption related process which is logically the same as that performed by the first circuit.

Then, the second circuit is provided with a reversal circuit that reverses the polarity of a signal bit. An output from a first node among a plurality of nodes composing the first circuit is compared with an output from a second node among a plurality of nodes composing the second circuit that is provided at a location corresponding to the location of the first node of the first circuit. When the polarities of the two outputs are not reversed with respect to each other, the encryption related processes performed by the first circuit and the second circuit are stopped.

CITATION LIST

Patent Literature

Patent Literature 1: JP 2006-229485 A

SUMMARY OF INVENTION

Technical Problem

Since the signal processing circuit of Patent Literature 1 is composed of a plurality of circuits that perform logically the same processes, there is a problem of an increase in circuit size.

The main object of the present invention is to solve problems such as that described above, and to prevent a signal in an unfixed state from being output due to an abnormal clock, with a simple configuration.

Solution to Problem

A signal processing apparatus according to the present invention includes a delaying unit that inputs an output signal output continuously from an arithmetic circuit, delays the output signal input, and outputs the output signal delayed as a delayed signal;

a comparing unit that inputs the output signal from the arithmetic circuit and inputs the delayed signal from the delaying unit in parallel with the input of the output signal from the arithmetic circuit, compares signal values between the output signal and the delayed signal input at same timing, and outputs one of a match signal and a mismatch signal as a comparison result signal, the match signal notifying that the compared signal values of the output signal and the delayed signal match each other, and the mismatch signal notifying that the compared signal values of the output signal and the delayed signal mismatch each other;

a determining unit that inputs a clock signal and inputs the comparison result signal from the comparing unit in parallel with the input of the clock signal, and determines, every time determination timing comes, whether the comparison result signal input in parallel at the determination timing is a match signal or a mismatch signal, the determination timing being at least one of clock rise timing and clock fall timing; and an output unit that inputs the output signal from the arithmetic circuit, and outputs the output signal from the arithmetic circuit when the determining unit inputs the match signal at determination timing, and outputs a specific fixed value instead of the output signal from the arithmetic circuit after the determining unit inputs the mismatch signal at the determination timing.

Advantageous Effects of Invention

In the present invention, only when an output signal and a delayed signal match each other, the output signal is output, and when the output signal and the delayed signal do not match each other, a fixed value is output.

Only when an output signal in a fixed state is compared with a delayed signal in a fixed state, the output signal and the delayed signal match each other. Thus, even if an output signal and a delayed signal do not match each other due to the occurrence of an abnormal clock, an output signal in an unfixed state is not output.

DESCRIPTION OF EMBODIMENTS

First Embodiment

In the present embodiment, in a configuration in which additional circuits are suppressed, output of failure data due to an abnormal clock is prevented.

In the following, first, a common signal processing circuit will be described, and then a signal processing apparatus according to the present embodiment will be described.

Figure 4:
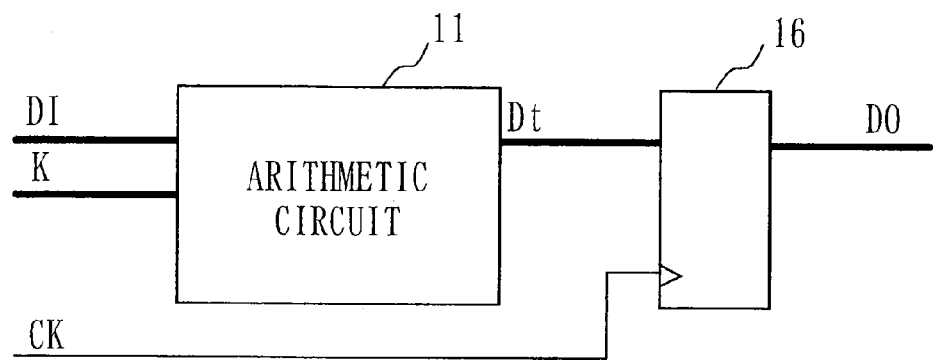
FIG. 4 is a diagram showing an exemplary configuration of a common signal processing circuit.

FIG. 4 is a diagram showing a configuration of a common signal processing circuit.

In FIG. 4, a thick connecting line indicates that a plural-bit signal is input and output, and a thin connecting line indicates that a 1-bit signal is input and output.

The signal processing circuit of FIG. 4 performs a computation using input data DI and key data K as input, and outputs the result thereof as output data DO.

The signal processing circuit of FIG. 4 is composed of an arithmetic circuit 11 and a flip-flop 16.

Input data DI and key data K are input to the arithmetic circuit 11, and the result thereof is output, as a plural-bit output signal Dt, to a plural-bit bus.

The input data DI and the key data K are input to the arithmetic circuit 11, and a computation result is output as an output signal Dt.

The arithmetic circuit 11 requires time to fix data due to circuit delay.

Figure 7:
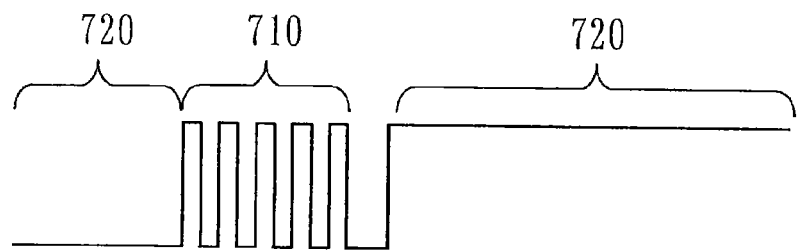
FIG. 7 is a diagram describing a fixed state and an unfixed state.

Specifically, as illustrated in FIG. 7, the output signal Dt from the arithmetic circuit 11 has an unfixed state 710 where the signal value is not fixed, and a fixed state 720 where the same signal value is maintained.

The fixed state 720 continues until the next input data DI and key data K are input to the arithmetic circuit 11.

The time of the unfixed state 710, in other words, the time during which the fixed state 720 continues, varies depending on the type of computation.

The arithmetic circuit 11 performs a plurality of types of computation according to a combination of input data DI and key data K.

The time required to complete a computation varies depending on the type of computation. In the case of a computation requiring a long period of time to complete the computation, the time of an unfixed state 710 is long and thus the time during which a fixed state 720 continues is short.

Next, the operation of this signal processing circuit will be described using FIG. 5.

Figure 5:
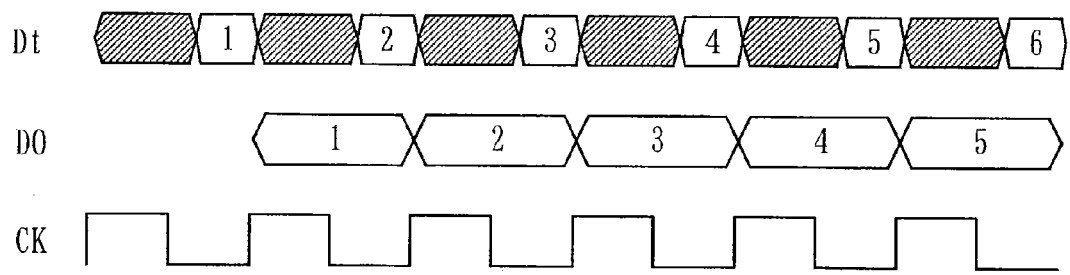
FIG. 5 is a timing chart for normal operation in the common signal processing circuit.

FIG. 5 is a timing chart of the flip-flop 16.

In FIG. 5, an unfixed state where data is unfixed is represented in bus form by "hatching".

In addition, a fixed state is represented in bus form with a number included therein.

Since the flip-flop 16 latches an output signal Dt at the rise timing of a clock signal CK, for DO, data is fixed delayed by one clock.

In this manner, only a signal in a fixed state is sent to a subsequent stage.

Figure 6:
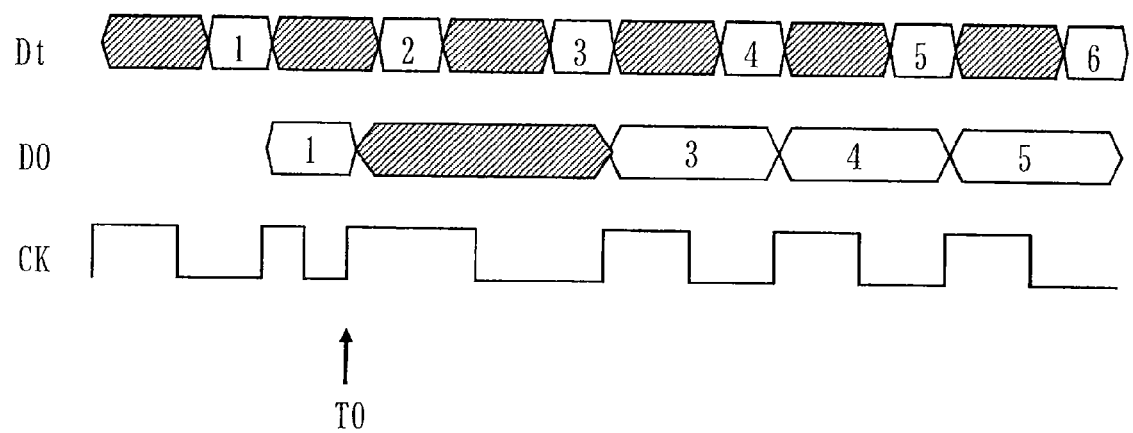
FIG. 6 is a timing chart for the occurrence of clock abnormality in the common signal processing circuit.

Next, a timing chart for when an abnormal clock is input is shown in FIG. 6.

When a clock signal CK is such as that shown in FIG. 6, since the flip-flop 16 latches an unfixed bus (an output signal Dt in an unfixed state) at time T0 (abnormal clock), its output DO results in abnormal data in which the unfixed bus is latched.

Then, the abnormal data in which the unfixed bus is latched is finally output as a computation result.

Figure 1:
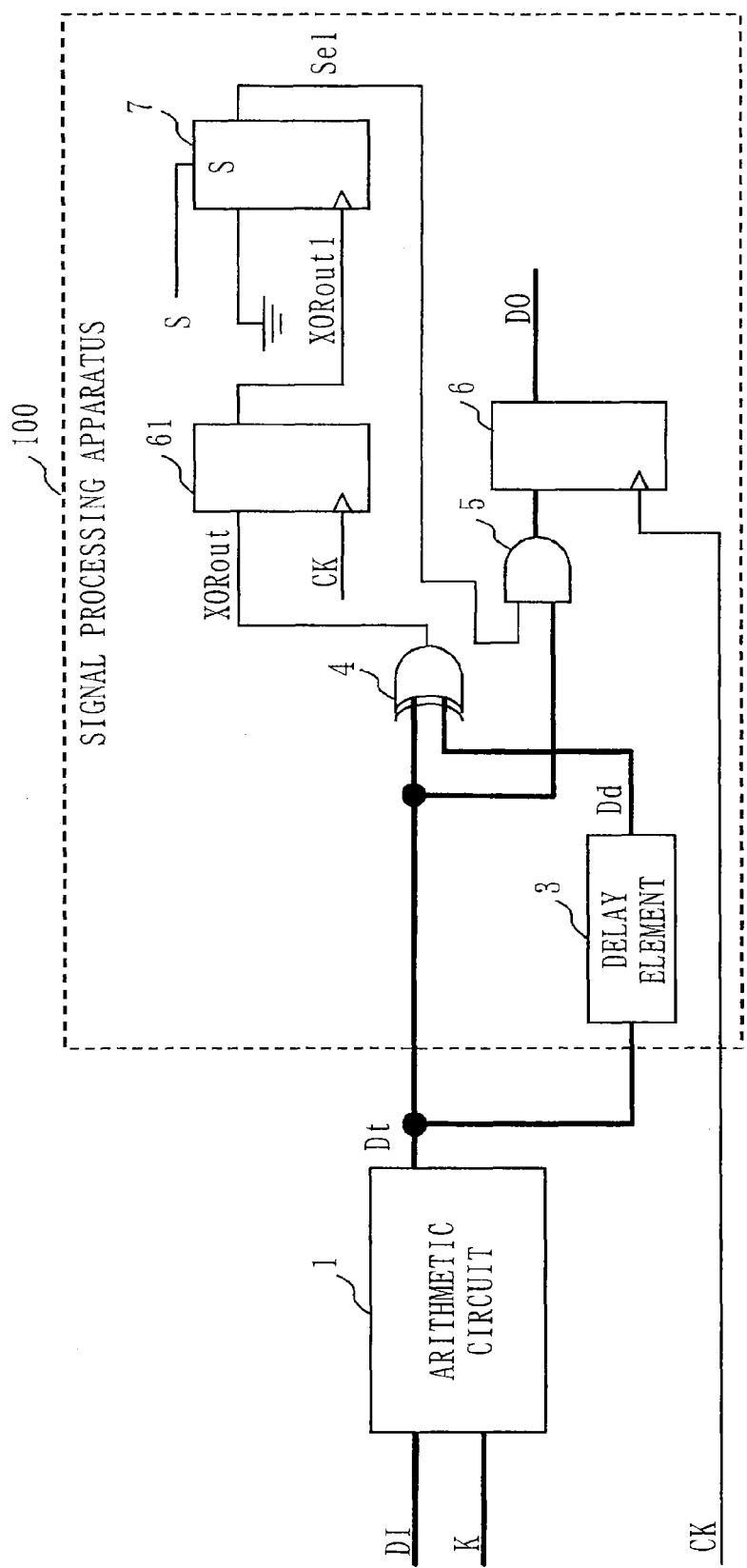
FIG. 1 is a diagram showing an exemplary configuration of a signal processing apparatus according to a first embodiment.

FIG. 1 shows a circuit configuration according to the present embodiment.

In FIG. 1, a thick connecting line indicates that a plural-bit signal is input and output, and a thin connecting line indicates that a 1-bit signal is input and output.

In the present embodiment, an arithmetic circuit 1 performs a computation using input data DI and key data K as input, and a signal processing apparatus 100 outputs a computation result as output data DO.

Note that the arithmetic circuit 1 and the signal processing apparatus 100 shown in FIG. 1 together are also referred to as a secure arithmetic apparatus.

Input data DI and key data K are input to the arithmetic circuit 1, and a computation result is output, as a plural-bit output signal Dt, to a plural-bit bus.

Note that as with the arithmetic circuit 11 shown in FIG. 4, the output signal Dt from the arithmetic circuit 1 has an unfixed state 710 where the signal value is not fixed, and a fixed state 720 where the same signal value is maintained.

The signal processing apparatus 100 is composed of a delay element 3, an XOR (eXclusive OR) element 4, an AND element 5, a flip-flop 6, a flip-flop 61, and a flip-flop with set 7.

The output signal Dt is connected to the delay element 3 and one of input terminals of the XOR element 4.

The delay element 3 inputs the plural-bit output signal Dt which is output continuously from the arithmetic circuit 1, delays the input output signal Dt, and outputs the delayed output signal Dt as a delayed signal Dd.

The output of the delay element 3 is connected to the other input terminal of the XOR element 4, and the delayed signal Dd is input to the XOR element 4.

The delay element 3 corresponds to an example of a delaying unit.

An output from the XOR element 4 is 1 bit, and outputs "0" when all of the values of corresponding bits of buses to be input match, and outputs "1" when there is even 1 bit of difference in the values of the corresponding bits.

The XOR element 4 corresponds to an example of a comparing unit.

The XOR element 4 inputs the plural-bit output signal Dt from the arithmetic circuit 1 and inputs the plural-bit delayed signal Dd from the delay element 3 in parallel with the input of the output signal Dt from the arithmetic circuit 1, and compares signal values between the plural-bit output signal Dt and the plural-bit delayed signal Dd which are input at the same timing.

Then, if the signal values of the output signal Dt and the delayed signal Dd match for all bits, then the XOR element 4 outputs a match signal (signal value "0") which notifies that the signal values of the output signal Dt and the delayed signal Dd match as an XORout signal (comparison result signal).

On the other hand, if there is even 1 bit of difference in the signal values, then the XOR element 4 outputs a mismatch signal (signal value "1") which notifies that the signal values of the output signal Dt and the delayed signal Dd mismatch as an XORout signal (comparison result signal).

Only when an output signal Dt in a fixed state 720 is compared with a delayed signal Dd in a fixed state 720, the signal values of all bits of the output signal Dt and the delayed signal Dd match.

Specifically, when the XOR element 4 inputs a delayed signal Dd in a fixed state 720 from the delay element 3 in parallel with input of an output signal Dt in a fixed state 720 from the arithmetic circuit 1, the signal value of the output signal Dt and the signal value of the delayed signal Dd match for all bits, and thus the XOR element 4 outputs a match signal (signal value "0") as an XORout signal.

On the other hand, when the XOR element 4 inputs a delayed signal Dd in an unfixed state 710 from the delay element 3 in parallel with input of an output signal Dt in a fixed state 720 or an output signal Dt in an unfixed state 710 from the arithmetic circuit 1, the signal value of the output signal Dt and the signal value of the delayed signal Dd do not match each other, and thus the XOR element 4 outputs a mismatch signal (signal value "1") as an XORout signal.

Furthermore, when the XOR element 4 inputs a delayed signal Dd in a fixed state 720 t from the delay element 3 in parallel with input of an output signal Dt in an unfixed state 710 from the arithmetic circuit 1, the signal value of the output signal Dt and the signal value of the delayed signal Dd do not match each other, and thus the XOR element 4 outputs a mismatch signal (signal value "1") as an XORout signal.

The 1-bit output (XORout signal) from the XOR element 4 is connected to the D terminal of the flip-flop 61 and is held at the clock timing of a clock signal CK, and is output from the Q terminal, as an XORout1 signal (1 bit).

Specifically, the flip-flop 61 inputs a clock signal CK and inputs an XORout signal (comparison result signal) from the XOR element 4 in parallel with the input of the clock signal CK, and determines, every rise of a clock, whether an XORout signal (comparison result signal) input in parallel at the rise of the clock is a match signal (signal value "0") or a mismatch signal (signal value "1").

If the XORout signal (comparison result signal) input in parallel at the rise of the clock is a mismatch signal (signal value "1"), then the flip-flop 61 outputs a valid signal (signal value "1") of an XORout1 signal.

On the other hand, if the XORout signal (comparison result signal) input in parallel at the rise of the clock is a match signal (signal value "0"), then the flip-flop 61 outputs an invalid signal (signal value "0") of an XORout1 signal.

The flip-flop 61 is an example of a determining unit and also corresponds to a first flip-flop.

Note that the flip-flop 61 according to the present embodiment uses clock rise timing as determination timing. In the present embodiment, an example is described in which the flip-flop 61 determines whether an XORout signal (comparison result signal) input in parallel at the rise of a clock is a match signal (signal value "0") or a mismatch signal (signal value "1").

However, clock fall timing may be used as determination timing The flip-flop 61 may determine whether an XORout signal (comparison result signal) input in parallel at the fall of a clock is a match signal (signal value "0") or a mismatch signal (signal value "1").

Furthermore, both clock rise timing and clock fall timing may be used as determination timing. The flip-flop 61 may determine, at the rise of a clock and at the fall of a clock, whether an XORout signal (comparison result signal) input in parallel at the rise and fall of the clocks is a match signal (signal value "0") or a mismatch signal (signal value "1").

The XORout1 signal is input to the clock terminal of the flip-flop with set 7.

In addition, a signal S is a signal that is input to the set terminal of the flip-flop with set 7 to control such that the flip-flop with set 7 is set immediately before a series of computations in the arithmetic circuit 1 start.

Until the flip-flop with set 7 inputs a valid signal (signal value "1") of an XORout1 signal from the flip-flop 61, the flip-flop with set 7 continues to output a valid signal (signal value "1") of an Sel signal, as a state signal notifying of a normal state.

Then, after a valid signal (signal value "1") of an XORout1 signal is input from the flip-flop 61, the flip-flop with set 7 continues to output an invalid signal (signal value "0") of an Sel signal, as a state signal notifying of an abnormal state.

The flip-flop with set 7 is an example of a state notifying unit and also corresponds to a second flip-flop.

The Sel signal (1 bit) which is an output from the flip-flop with set 7 is input to the AND element 5.

The AND element 5 outputs a logical multiply with the bus output from the arithmetic circuit 1.

Specifically, the AND element 5 inputs the plural-bit output signal Dt from the arithmetic circuit 1 and inputs the Sel signal from the flip-flop with set 7. If the Sel signal is a valid signal (signal value "1"), then the AND element 5 outputs the output signal Dt from the arithmetic circuit 1. On the other hand, if the Sel signal is an invalid signal (signal value "0"), then the AND element 5 outputs, as a fixed value, the Sel signal (signal value "0") from the flip-flop with set 7, to the flip-flop 6 instead of the output signal Dt from the arithmetic circuit 1.

The AND element 5 together with the flip-flop 6 is an example of an output unit.

The flip-flop 6 holds an output from the AND element 5 at the clock timing of a clock signal CK, and the output serves as an output DO.

Specifically, the flip-flop 6 outputs, as an output DO, the output signal Dt from the arithmetic circuit 1 or the fixed value in synchronization with the clock signal CK.

The flip-flop 6 together with the AND element 5 is an example of an output unit, and the flip-flop 6 corresponds to a third flip-flop.

Note that although FIG. 1 shows the case in which an output from the flip-flop with set 7 is input to the AND element 5, instead the output may be input to an element having the same function as the AND element 5.

In addition, the amount of delay in the delay element 3 is a time obtained by subtracting the setup time and hold time of a circuit of the flip-flop 6 from the minimum time for an output from the arithmetic circuit 1 to be fixed.

In other words, the amount of delay is one by which, while the XOR element 4 inputs an output signal Dt in a fixed state from the arithmetic circuit 1, the XOR element 4 can input a delayed signal Dd for the output signal Dt in the fixed state in parallel.

As described above, the time during which a fixed state 720 continues in an output signal Dt varies depending on the type of computation.

The delay element 3 delays the output signal Dt from the arithmetic circuit 1 by the amount of delay of time obtained by subtracting the setup time and hold time of the flip-flop 6 from the shortest time among times during which a fixed state 720 continues in the output signal Dt.

Next, operation will be described.

Figure 2:
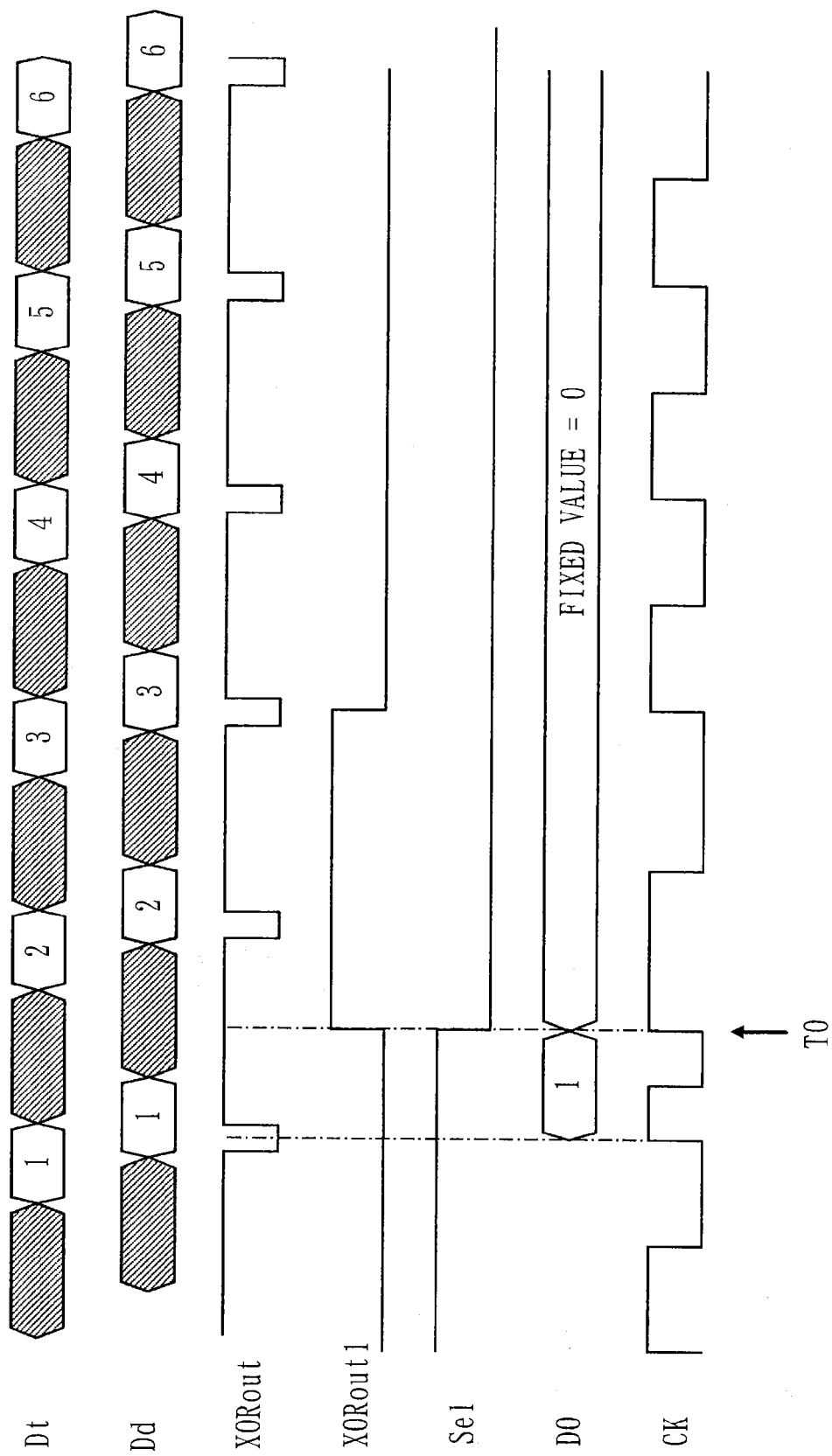
FIG. 2 is a timing chart for the occurrence of clock abnormality in the signal processing apparatus according to the first embodiment.

FIG. 2 is a timing chart of the flip-flop 6, etc., according to the present embodiment.

In FIG. 2, too, an unfixed state is represented in bus form by "hatching".

In addition, a fixed state is represented in bus form with a number included therein.

FIG. 2 shows the case in which an abnormal clock is input at time T0.

As described above, the XOR element 4 outputs an XORout signal of "0" when all bits of the compared output signal Dt and delayed signal Dd match, and outputs an XORout signal of "1" when there is even 1 bit of difference.

Since the flip-flop 61 holds the XORout signal at the clock rise timing of a clock signal CK, an output XORout1 from the flip-flop 61 is as shown in FIG. 2.

At the timing of T0 at which an abnormal clock is input, since the XOR element 4 compares an output signal Dt in an unfixed state with a delayed signal Dd in an unfixed state, the XORout signal is "1".

Hence, the output XORout1 from the flip-flop 61 changes from "0" to "1" at the rise of the abnormal clock.

Due to this change, an output Sel from the flip-flop with set 7 changes from "1" to "0", and thereafter the Sel signal is fixed at "0" until a signal S provides a set instruction.

Since the Sel signal is an input to the AND element 5, an output from the AND element 5 is the fixed value 0.

This state continues until the signal S provides a set instruction.

As a result, the output from the flip-flop 6 after the abnormal clock (time T0) is the fixed value "0", irrespective of the state of the output signal Dt.

That is, in the flip-flop 61, when the signal value of an XORout signal at the rise of a clock becomes "1" even once, the fixed value "0" continues to be output.

Figure 3:
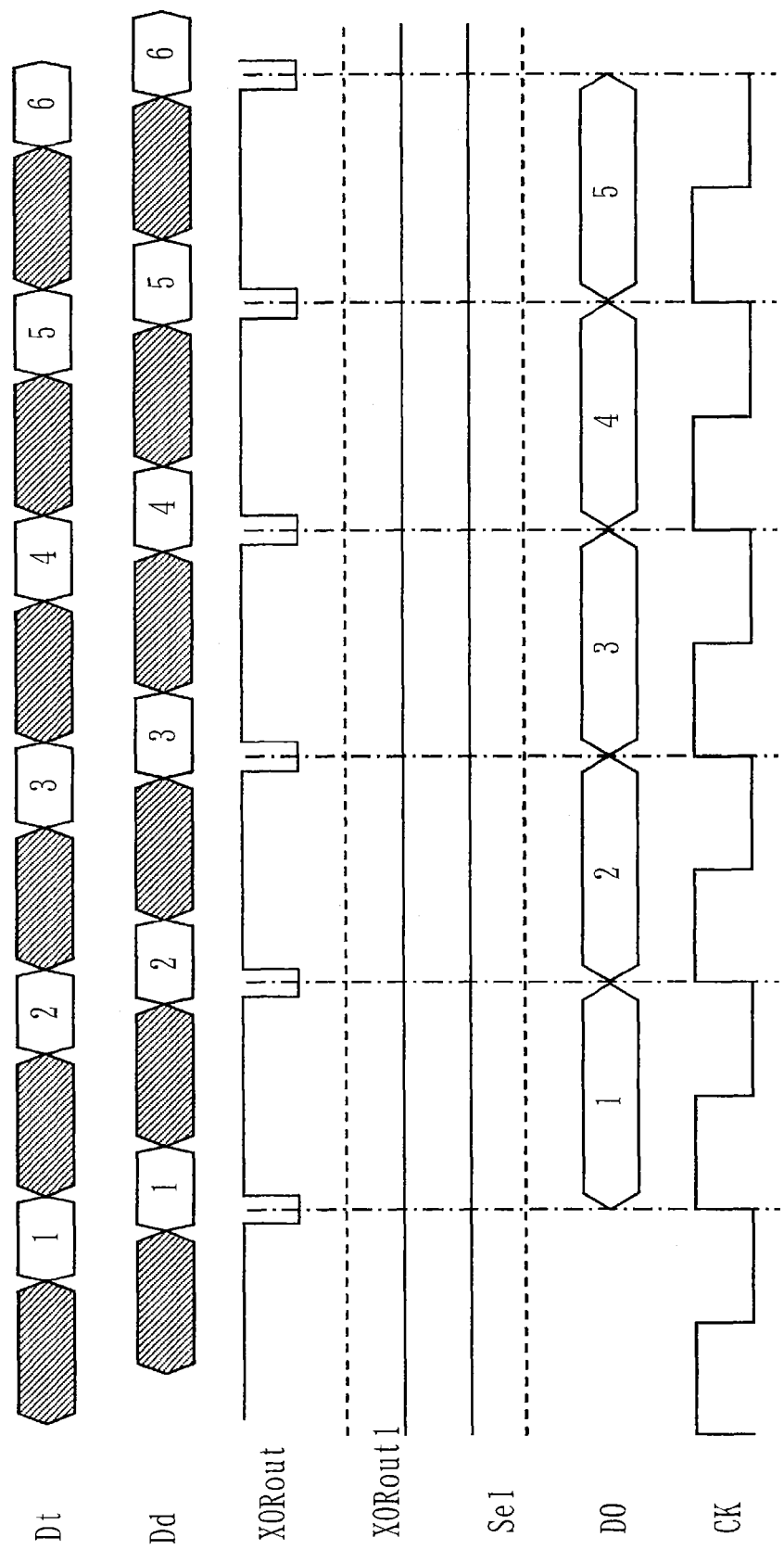
FIG. 3 is a timing chart for normal operation in the signal processing apparatus according to the first embodiment.

In addition, FIG. 3 is a timing chart of the flip-flop 6, etc., for when a normal clock signal CK is input in the signal processing apparatus 100 of the present embodiment.

Now, the reason that the amount of delay in the delay element 3 is set to a time obtained by subtracting the setup time and hold time of the flip-flop 6 from the minimum time for an output from the arithmetic circuit 1 to be fixed will be described.

An output signal Dt in a fixed state 720 and a delayed signal Dd in a fixed state 720 need to be input to the XOR element 4 in parallel.

In FIG. 2, a section needs to be present where the sections <1> of the output signal Dt and the delayed signal Dd overlap each other.

If the amount of delay in the delay element 3 is set to the minimum time of a fixed state 720, then there is a possibility that a section where the sections <1> of the output signal Dt and the delayed signal Dd overlap each other may not be present.

In order for the time of a fixed state 720 of the output signal Dt and the time of a fixed state 720 of the delayed signal Dd to overlap each other, the delay amount in the delay element 3 needs to be set to a shorter time than the minimum time of the fixed state 720.

On the other hand, for proper operation of the flip-flop 6, there is a need to secure setup time and hold time, and thus the setup time and hold time of the flip-flop 6 need to be reflected in the amount of delay.

Because of such requirements, the amount of delay in the delay element 3 is set to a time obtained by subtracting the setup time and hold time of the flip-flop 6 from the minimum time of the fixed state 720.

As described above, in the secure arithmetic apparatus according to the present embodiment, an output signal from the arithmetic circuit is delayed, a determination is made as to whether the output signal and the delayed signal match or mismatch each other, and the determination result of a mismatch is continuously held.

Specifically, in FIG. 2, when an XORout signal with the signal value "1" is input to the flip-flop 61 at the rise of a clock, an Sel signal is fixed at "0".

Hence, even if an abnormal clock occurs, an output signal in an unfixed state is not output, and instead a fixed value is output.

That is, only when an output signal in a fixed state is compared with a delayed signal in a fixed state, the output signal and the delayed signal match each other. Thus, even if an output signal and a delayed signal do not match each other due to the occurrence of an abnormal clock, an output signal in an unfixed state is not output.

Hence, the secure arithmetic apparatus of the present embodiment has resistance to failure induction attacks where an abnormal clock is induced to output failure data based on a failure state in a circuit, thereby sneaking confidential information.

In the present embodiment, a secure arithmetic apparatus is described above that compares a computation result obtained by computing data and confidential data in combination, with a delayed signal obtained by delaying the computation result, and outputs a fixed value instead of the computation result when the computation result and the delayed signal mismatch each other.

In addition, it is described that the secure arithmetic apparatus according to the present embodiment holds, when the computation result and the delayed signal mismatch each other, a mismatch state until a series of computations are completed, and outputs a fixed value instead of the computation result.

In addition, it is described that the secure arithmetic apparatus according to the present embodiment uses a delay element having the amount of delay which is obtained by subtracting the setup time and hold time of a flip-flop from the minimum time for an output from an arithmetic circuit to be fixed.

REFERENCE SIGNS LIST

1: arithmetic circuit, 3: delay element, 4: XOR element, 5: AND element, 6: flip-flop, 7: flip-flop with set, 11: arithmetic circuit, 16: flip-flop, 61: flip-flop, and 100: signal processing apparatus

The invention claimed is:

1. A signal processing apparatus comprising:
a delaying unit that inputs an output signal output continuously from an arithmetic circuit, delays the output signal input, and outputs the output signal delayed as a delayed signal;
a comparing unit that inputs the output signal from the arithmetic circuit and inputs the delayed signal from the delaying unit in parallel with the input of the output signal from the arithmetic circuit, compares signal values between the output signal and the delayed signal input at same timing, and outputs one of a match signal and a mismatch signal as a comparison result signal, the match signal notifying that the compared signal values of the output signal and the delayed signal match each other, and the mismatch signal notifying that the compared signal values of the output signal and the delayed signal mismatch each other;
a determining unit that inputs a clock signal and inputs the comparison result signal from the comparing unit in parallel with the input of the clock signal, and determines, every time determination timing comes, whether the comparison result signal input in parallel at the determination timing is a match signal or a mismatch signal, the determination timing being at least one of clock rise timing and clock fall timing; and
an output unit that inputs the output signal from the arithmetic circuit, and outputs the output signal from the arithmetic circuit when the determining unit inputs the match signal at determination timing, and outputs a specific fixed value instead of the output signal from the arithmetic circuit after the determining unit inputs the mismatch signal at the determination timing.

2. The signal processing apparatus according to claim 1, wherein
the delaying unit:
inputs an output signal in a fixed state where a same signal value is maintained and an output signal in an unfixed state where a signal value is not fixed, from the arithmetic circuit; and
delays the output signal from the arithmetic circuit by an amount of delay by which, the comparing unit can input a delayed signal for the output signal in the fixed state in parallel, while the comparing unit inputs the output signal in the fixed state from the arithmetic circuit and
when the comparing unit inputs the delayed signal for the output signal in the fixed state from the delaying unit in parallel with the input of the output signal in the fixed state from the arithmetic circuit, a signal value of the output signal in the fixed state from the arithmetic circuit matches a signal value of the delayed signal for the output signal in the fixed state from the delaying unit, and, the comparing unit outputs a match signal as the comparison result signal.

3. The signal processing apparatus according to claim 2, wherein the determining unit:

inputs, at determination timing of a normal clock according to a normal clock cycle, the match signal output from the comparing unit as a result of inputting the delayed signal for the output signal in the fixed state from the delaying unit in parallel with input of an output signal in a fixed state from the arithmetic circuit; and inputs, at determination timing of an invalid clock being out of the normal clock cycle, one of the mismatch signal output from the comparing unit as a result of inputting the delayed signal for the output signal in the unfixed state from the delaying unit in parallel with input of the output signal in the fixed state or the output signal in the unfixed state from the arithmetic circuit, and the mismatch signal output from the comparing unit as a result of inputting the delayed signal for the output signal in the fixed state from the delaying unit in parallel with input of the output signal in the unfixed state from the arithmetic circuit, and the output unit:

outputs the output signal from the arithmetic circuit while the determining unit inputs the match signal at determination timing as a result of the normal clock being maintained in the clock signal which the determining unit inputs; and outputs the fixed value after the determining unit inputs the mismatch signal at determination timing as a result of occurrence of abnormality in the clock signal which the determining unit inputs.

4. The signal processing apparatus according to claim 3, wherein after the determining unit inputs the mismatch signal at the determination timing, the output unit continues to output the fixed value until the arithmetic circuit completes a computation.

5. The signal processing apparatus according to claim 4, further comprising:

a state notifying unit that outputs a state signal to the output unit, the state signal notifying of a state of the determining unit, the state notifying unit:

outputs a state signal notifying of a normal state to the output unit while the determining unit inputs the match signal at determination timing as a result of the normal clock being maintained in the clock signal which the determining unit inputs; and outputs a state signal notifying of an abnormal state to the output unit when the determining unit inputs the mismatch signal at determination timing as a result of occurrence of abnormality in the clock signal which the determining unit inputs, and holds the output of the state signal notifying of the abnormal state until the arithmetic circuit completes a computation, wherein the output unit:

outputs the output signal from the arithmetic circuit while inputting the state signal notifying of the normal state from the state notifying unit; and outputs the fixed value while inputting the state signal notifying of the abnormal state from the state notifying unit.

6. The signal processing apparatus according to claim 5, wherein the comparing unit is an XOR (eXclusive OR) element that is connected to the arithmetic circuit and the delaying unit and that inputs a plural-bit output signal from the arithmetic circuit and inputs a plural-bit delayed signal from the delaying unit in parallel with the input of the output signal from the arithmetic circuit, compares signal values between the plural-bit output signal and the plural-bit delayed signal input at same timing, and outputs a match signal when the compared signal values of the output signal and the delayed signal match for all bits, and outputs a mismatch signal when there is a mismatch between the compared signal values of the output signal and the delayed signal even for 1 bit, the determining unit is a first flip-flop that is connected to the XOR element and that inputs a comparison result signal from the XOR element in parallel with the input of the clock signal and outputs a valid signal when the comparison result signal input in parallel at determination timing is the mismatch signal, the state notifying unit is a second flip-flop that is connected to the first flip-flop and that continues to output a valid signal as the state signal notifying of the normal state until inputting the valid signal from the first flip-flop, and continues to output an invalid signal as the state signal notifying of the abnormal state after inputting the valid signal from the first flip-flop, and the output unit is:

an AND element that is connected to the arithmetic circuit and the second flip-flop and that inputs the plural-bit output signal from the arithmetic circuit and inputs the state signal from the second flip-flop, and outputs the plural-bit output signal from the arithmetic circuit when the state signal from the second flip-flop is the valid signal, and outputs, when the state signal from the second flip-flop is the invalid signal, the invalid signal from the second flip-flop as the fixed value; and a third flip-flop that is connected to the AND element and that outputs the output signal from the arithmetic circuit or the invalid signal in synchronization with the clock signal.

7. The signal processing apparatus according to claim 6, wherein a time during which a fixed state continues in the output signal varies depending on a type of computation performed by the arithmetic circuit, and the delaying unit delays the output signal from the arithmetic circuit by an amount of delay of time obtained by subtracting setup time and hold time of the third flip-flop from a shortest time among times during which a fixed state continues in the output signal.

8. The signal processing apparatus according to claim 1, wherein the delaying unit, the comparing unit, and the output unit input the output signal from the arithmetic circuit that computes data and confidential data in combination.

* * * * *